(12) United States Patent
Knoblich et al.

(10) Patent No.: US 7,692,857 B2
(45) Date of Patent: Apr. 6, 2010

(54) DEVICE FOR VARYING AND ADJUSTING TRANSMITTED ILLUMINATION FOR MICROSCOPES

(75) Inventors: Johannes Knoblich, Jena (DE); Tobias Kaufhold, Jena (DE); Detlef Hein, Goettingen (DE)

(73) Assignee: Carl Zeiss Microimaging GmbH, Jena (DE)

( * ) Notice: Subject to any disclaimer, the term of this patent is extended or adjusted under 35 U.S.C. 154(b) by 112 days.

(21) Appl. No.: 11/539,002

(22) Filed: Oct. 5, 2006

(65) Prior Publication Data
US 2007/0097498 A1    May 3, 2007

(30) Foreign Application Priority Data
Oct. 5, 2005    (DE) ................. 10 2005 047 593

(51) Int. Cl.
G02B 21/06    (2006.01)
B02B 21/00    (2006.01)
(52) U.S. Cl. .................. 359/388; 359/368; 359/387
(58) Field of Classification Search .......... 359/368–390
See application file for complete search history.

(56) References Cited

U.S. PATENT DOCUMENTS

| | | | | |
|---|---|---|---|---|
| 4,687,304 A * | 8/1987 | Piller et al. | ................. | 359/387 |
| 5,325,231 A * | 6/1994 | Tamura et al. | ............. | 359/387 |
| 5,684,627 A * | 11/1997 | Ganser et al. | ............... | 359/388 |
| 5,703,714 A * | 12/1997 | Kojima | ....................... | 359/368 |
| 5,982,532 A * | 11/1999 | Mittelstadt et al. | .......... | 359/368 |
| 6,384,967 B1 * | 5/2002 | Watanabe et al. | ........... | 359/385 |
| 6,396,628 B1 * | 5/2002 | Osa et al. | .................... | 359/385 |
| 2003/0090789 A1 * | 5/2003 | Herz et al. | .................. | 359/368 |
| 2005/0111086 A1 * | 5/2005 | Knoblich et al. | ............ | 359/368 |
| 2007/0041091 A1 * | 2/2007 | Takeuchi | .................... | 359/386 |

* cited by examiner

*Primary Examiner*—Thong Nguyen
(74) *Attorney, Agent, or Firm*—Eugene LeDonne; Joseph W. Treloar; Frommer Lawrence & Haug LLP

(57) ABSTRACT

The present invention serves to vary and adjust the transmitted light illumination in microscopes, particularly with respect to the numerous, different illumination situations. The device, according to the invention comprises modules for darkfield illumination, brightfield illumination, and/or diffuse illumination and/or for adapting the object field in which an illumination unit can be selectively coupled to different modules and in which actuators are provided for implementing the adjustments within the modules and for producing the desired connections, these actuators being operated by means of operating elements of a control unit. The adjustments within the modules and the implemented connections are detected and are stored in the control unit so as to be reproducible. The proposed solution makes possible a broad application by means of an ergonomic arrangement of the operating elements and adjusting and/or changing the illumination situations in a simple and reproducible manner.

14 Claims, 3 Drawing Sheets

DEVICE FOR VARYING AND ADJUSTING TRANSMITTED ILLUMINATION FOR MICROSCOPES

CROSS-REFERENCE TO RELATED APPLICATION

This application claims priority of German Application No. 10 2005 047 593.0, filed Oct. 5, 2005, the complete disclosure of which is hereby incorporated by reference.

BACKGROUND OF THE INVENTION a) Description of the Related Art

The present invention is directed to a device for varying and adjusting the transmitted illumination for microscopes, particularly with respect to the numerous different illumination situations.

b) Description of the Related Art

Aside from conventional transmitted brightfield illumination which couples the more-or-less directed illumination light directly into the imaging system of microscopes via the object, solutions for implementing oblique illumination are also known from the prior art. In the simplest case, this oblique illumination can be realized by tilting and/or displacing a mirror used for beam deflection. It is possible to improve contrast by means of oblique and/or one-side illumination.

In the C-DSD 230 transmitted-light illuminator by Nikon, a diaphragm is displaced directly on a deflecting mirror for improved contrast. In many embodiment forms of transmitted illumination systems, it is possible to switch between different adapting optics in order to adapt simple transmitted brightfield illumination to different visual fields which chiefly depend on the adjusted magnification and on the objectives that are used.

In accordance with the user's wishes, the brightness should be adjustable, if possible, with preset desired color temperature. This is often carried out at separate cold light sources so as to avoid impermissible heating of the specimens and microscope.

In some transmitted illumination arrangements, it is possible to insert different filters and/or ground glass diffuser screens to achieve a diffuse illumination.

Further, transmitted darkfield illumination arrangements can be used as an alternative illumination method in modern illumination devices. In this case, the light of the illumination source is guided past the objective and only light that is scattered at the object, diffusely reflected light, interrupted and/or diffracted light is coupled into the objective.

A large number of operating elements are red to dust a particular illumination situation. This is especially true for modern transmitted illumination deices. An illumination situation that has been adjusted one time cannot be reproduced again or, if so, only with considerable effort. This is because intermediate positions must often be adjusted and the large number of operating elements makes this very complicated.

Some of the operating elements must be combined in a certain way to enable useful illumination conditions. These combinations must be adjusted manually by the user. Particularly users who seldom work with the microscope in question do not possess the required knowledge about useful combinations, and this knowledge cannot be acquired without considerable effort.

Further, the arrangement of operating elements is often disadvantageous in ergonomic respects. This poses another obstacle to ease of use and manageability. Further, the large number of moving operating elements renders the construction of the stand very costly. Stability must be maintained in spite of the many openings. Moreover, scattered light must be prevented from exiting and the penetration of liquid and dust must be prevented. Considerable construction resources must be expended to prevent the disadvantages effects mentioned above while maintaining the desired large range of operations of the transmitted illumination device, which makes manufacture extremely expensive.

OBJECT AND SUMMARY OF THE INVENTION

It is the primary object of the present invention to facilitate operation of the transmitted illumination device for the user by means of an ergonomic arrangement of the operating elements and adjusting and/or changing the illumination situations in a simple and reproducible manner. The solution makes it possible to adjust numerous different illumination situations for as many applications as possible and can be incorporated without difficulty in the total microscope system.

According to the invention, this object is met, in accordance with the invention, by a device for varying and adjusting the transmitted illumination for microscopes comprising modules for darkfield illumination, brightfield illumination, and/or diffuse illumination and/or for adapting the object field. An illumination unit is provided which is adapted to being selectively coupled to different modules. Actuators are also provided for implementing the adjustments within the modules and for producing the desired connections. The actuators are operated by operating elements of a control unit wherein adjustments within the modules and the implemented connections are detected and are stored in the control unit so as to be reproducible.

The device according to the invention for varying and adjusting the transmitted illumination for microscopes comprises modules for darkfield illumination, brightfield illumination, and diffuse illumination and/or for adapting the object field in which an illumination light source having devices for dimming and mixing can be selectively coupled to different modules. Actuators are provided for implementing the adjustments within the modules and for producing the desired connections, these actuators being operated by means of operating elements of a control unit. The adjustments within the modules and the implemented connections are detected by sensors and are stored in the control unit so as to be reproducible.

The proposed device is provided particularly for varying and adjusting transmitted illumination in microscopes. The proposed device can be used in microscopes for many different applications because of the large number of possible predetermined or user-specific illumination variants and particularly because the latter are reproducible.

The invention will be described more fully in the following with reference to embodiment examples.

DESCRIPTION OF THE PROPOSED EMBODIMENTS

The proposed device for varying and adjusting transmitted illumination for microscopes comprises modules for darkfield illumination, brightfield illumination, and diffuse illumination and/or for adapting the object field in which an illumination light source can be selectively coupled to different modules and in which actuators are provided for implementing the adjustments within the modules and for producing the desired connections, these actuators being operated by means of operating elements of a control unit. The adjustments within the modules and the implemented connections are detected and are stored in the control unit so as to be reproducible.

Figure 1:
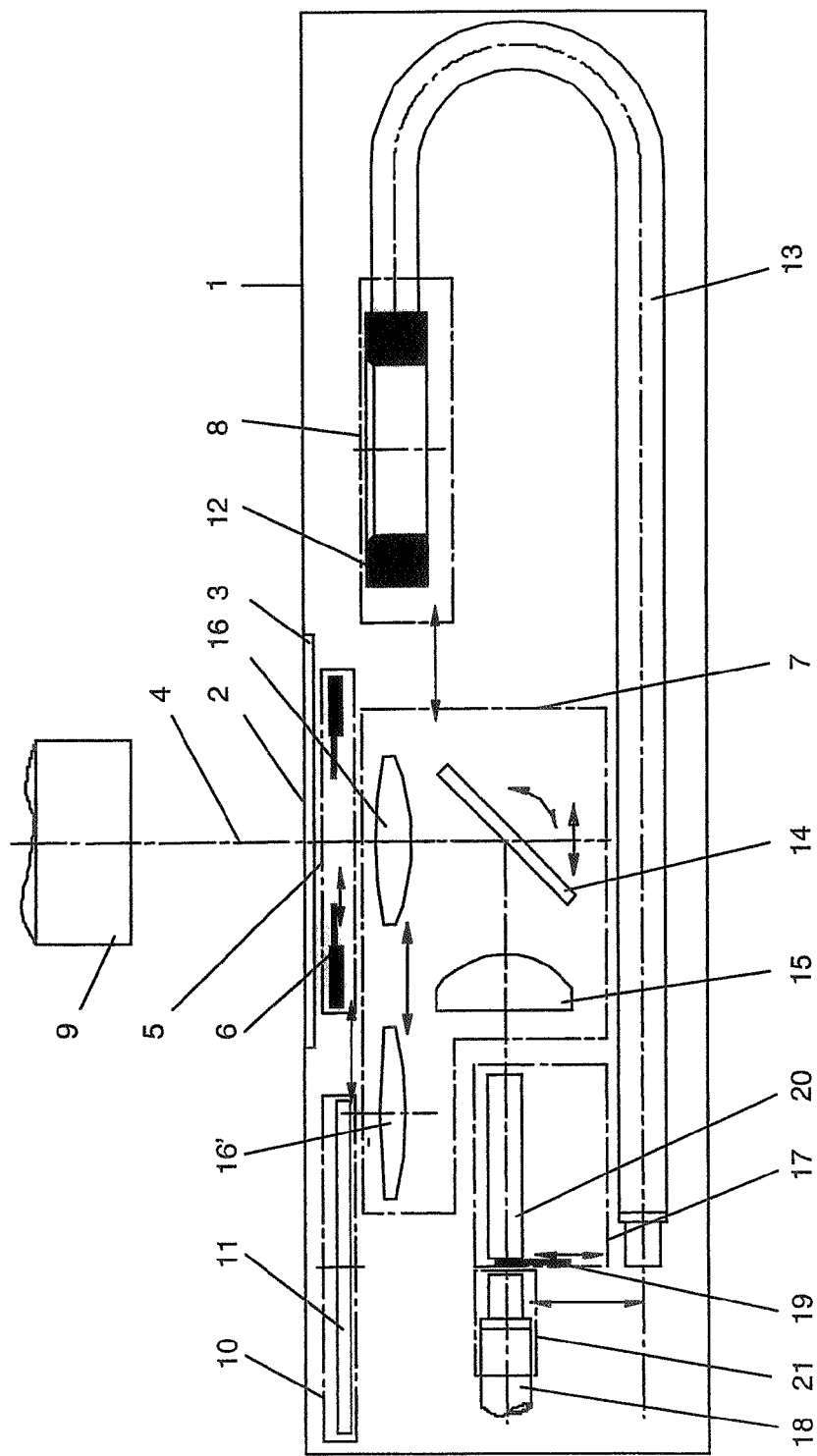
FIG. 1 shows the device according to the invention for varying and adjusting transmitted illumination for microscopes.

FIG. 1 shows the device according to the invention for varying and adjusting the transmitted illumination for microscopes. The individual modules are enclosed by dash-dot lines and possible movements or adjustments are indicated by arrows.

The device 1 according to the invention comprises a plurality of modules for varying and adjusting the transmitted illumination. An iris diaphragm module 5 containing an iris diaphragm 6 whose diameter can be varied by motor is arranged close below the object plane 2 and object carrier 3 concentric to the optical axis 4. While iris diaphragm mode 5 acts in combination with the module for brightfield illumination 7 as a field diaphragm due to the proximity of the object plane 2, an optimal adaptation of the illumination to the actual imaging conditions and to the objective 9 currently in use is made possible in connection with the module for darkfield illumination 8.

As an alternative to the iris diaphragm module 5, a module for diffuse illumination can be introduced by motor into the beam path so as to be concentric to the optical axis 4. This module for diffuse illumination 10 can contain one or more ground glass diffuser screens 11 which are arranged on a filter wheel and have different diffusing effects.

The modules for brightfield illumination 7 and for darkfield illumination 8 are arranged below these two modules 5 and 10 and can be selectively introduced by motor into the beam path concentric to the optical axis 4.

The module for darkfield illation 8 comprises a ring light 12 which can be connected to the illumination unit 17 by a fiber-optic connection 13.

The module for brightfield illumination 7 comprises a deflecting mirror 14 which is arranged so as to be displaceable and/or rotatable with respect to its position, optics for beam shaping 15, and at least one optical arrangement or adapting to the size of the object field 16 and can be connected to the illumination light source. Also, second optics are provided for adapting to the size of the object field 16', and it is possible to switch by motor selectively between the two optics 16 (large object field) and 16' (small object field) depending on the object field. In principle, it is also possible to provide a filter wheel with more than two optics for adapting more exactly to the size of the object field 16 and 16', respectively. One-side illumination with special contrasting effects can be achieved by means of the deflect mirror 14 which is arranged in the module for brightfield illumination 7 so as to be displaceable and/or rotatable with respect to its position.

The illumination unit 17 has a light guide 18 which has a connection to a separate cold light source, a diaphragm arrangement 19 for dimming, and a light mixing rod 20 for mixing. The illumination unit 17 can be coupled in a motor-operated manner by an actuating drive 21 to the module for brightfield illumination 7 and to the module for darkfield illumination 8. The emitted illumination light can be changed with respect to brightness and illumination intensity by the diaphragm arrangement 19 in that a simple motor-actuated diaphragm arrangement 19 is arranged between the illumination unit 17 and the light mixing rod 20. The free cross section of the light guide 18 can be increasingly covered in a continuous manner. The light mixing rod 20 provides for a uniform light distribution over the surface by mixing the light. Naturally, it is also possible in principle to implement the preferably color-neutral dimming and/or spectral mixing of the illumination light by electrical manipulation of the cold light source. In particular, the color temperature of the illumination light can be adjusted by means of the control unit. Further, the illumination unit 17 can also have only a receiving device for a light guide 18. This has the advantage that different light guides 18, which can be connected, e.g., to different cold light sources, can be introduced as needed.

In a particularly advantageous construction, stepper motors are used as actuators because, in this way, sensors for detecting the adjustments within the modules and the implemented connections can be dispensed with. For this purpose it is necessary to initialize the stepper motors when switching on. After the stepper motors detect their initial position in this way, the respective current positions can be determined by evaluating the steps.

The control unit has ergonomically arranged operating elements and additional elements for displaying the modules used at that moment. The control unit is capable of storing standard illumination programs for determined applications as well as application-specific or user-specific illumination programs and/or offering and/or displaying all possible adjustments. In particular, the control unit can also have elements for hand-free operation.

Application-specific illumination programs which are particularly suited to the following applications, for example, can be preset in the control unit:
 reflecting objects,
 phase objects,
 very high-contrast objects,
 highly absorbent objects,
 illumination which is as homogeneous as possible,
 maximum illumination intensity,
 diffuse illumination,
 camera observation of objects, and
 photography.

Different settings for implementing certain illumination programs can be compulsorily linked to one another by the control unit or can be blocked for certain applications. For example, when the darkfield illumination module 8 is switched on, it is pointless to dim the illumination light if dimming is only effective for the brightfield illumination module 7. Linked or mutually exclusive settings of this kind can easily be detected electronically and displayed to the user, for example, in that small LEDs light up in the control pad. It is also possible to indicate the module being used at that moment through colored LEDs at the control unit or, in a particularly advantageous manner, by reflecting the corresponding displays into a special eyepiece.

In order to meet safety guidelines, the brightness of the illumination unit in all variations and adjustments bringing about a change in image brightness is advantageously limited to a maximum value which can be predetermined and is not harmful for the user.

Figure 2:
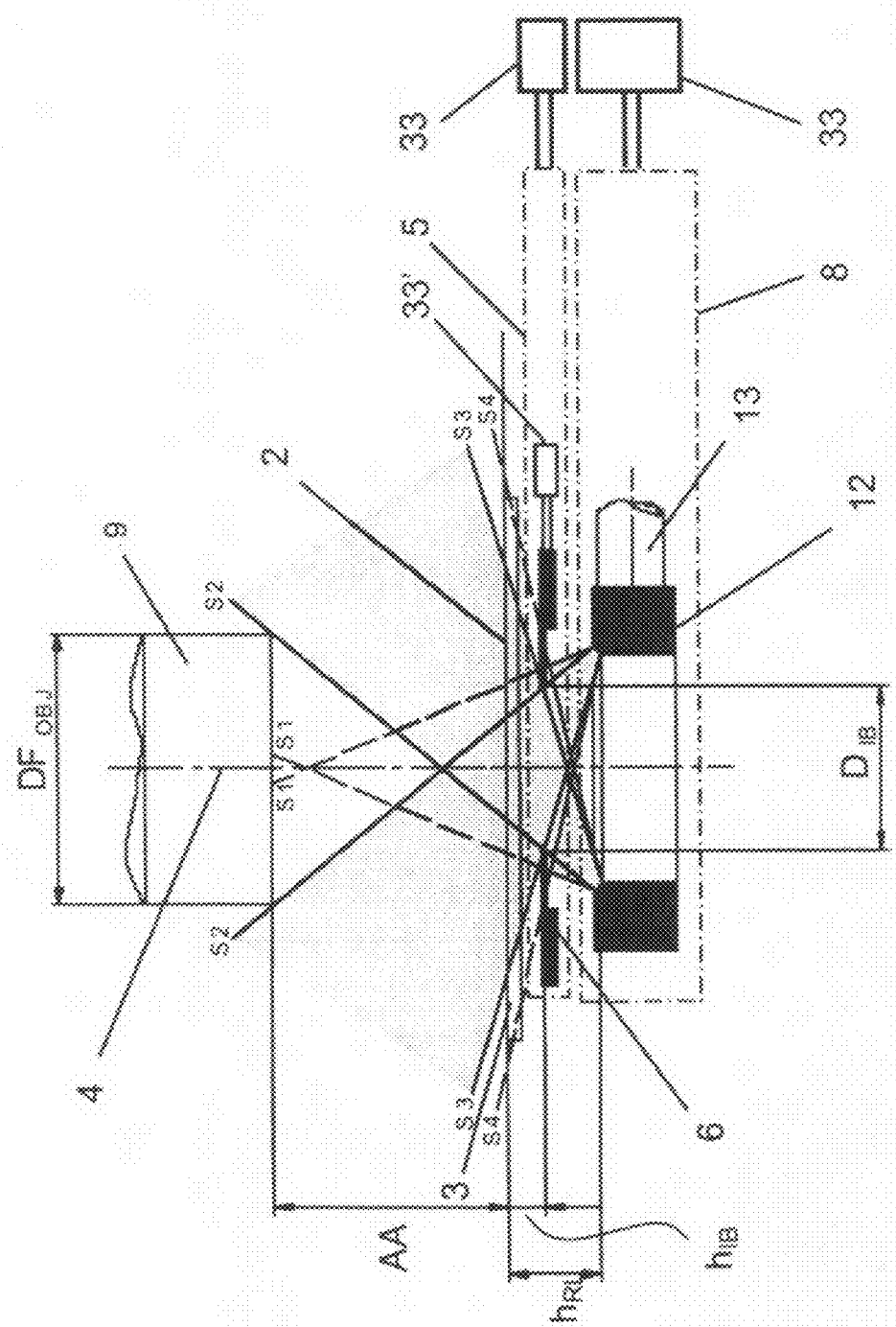
FIG. 2 shows the combination of different modules for realizing darkfield illumination.

The combination of different modules for realizing a darkfield illumination is shown in FIG. 2. The module for darkfield illumination 8 is connected to the illumination unit 17 via a light guide connection 13 and was inserted into the beam path concentric to the optical axis 4 by motor so that the exit slit of the ring light 12 is located at a distance $h_{RL}$ below the object plane 2. In addition, the iris diaphragm module 5 is arranged concentric to the optical axis 4 for optimally adapting the illumination to the actual imaging conditions and to the objective 9 that is used at the time. The iris diaphragm 6 is located at a distance $h_{IB}$ below the object plane 2. The radiating characteristic of the ring light 12 is illustrated by the beam shapes S1 to S4 which are rotationally symmetric with respect to the optical axis 4. Without the iris diaphragm 6, all of the rays between S1 and S2 would enter the free objective diameter $DF_{OBJ}$ of the objective 9 which is positioned in the free working distance AA above the object plane 2. This would appreciably worsen the contrast, which is undesirable in most cases. Only when the iris diaphragm module 5 is used is it possible to generate a true and effective darkfield illumination by corresponding adjustment of the diameter $D_{IB}$ of the iris diaphragm 6 which is adjustable by motor. Actuators for moving the modules 33 and an actuator for adjustments inside the modules 33' are also shown by FIG. 2.

Based on the relevant information about the objective being used, the working distance AA and the free objective diameter $DF_{OBJ}$, the motor-actuated iris diaphragm 6 can be adjusted automatically in such a way that no direct light from the ring light 12 is coupled into the objective 9 without being affected by the object. While the required diameter $D_{IB}$ can easily be calculated by the incept to, the radiating characteristic of the ring light 12 is known only approximately so that the values for the objectives 9 that are used should be determined once empirically for the sake of safety and then entered in the total system.

Figure 3:
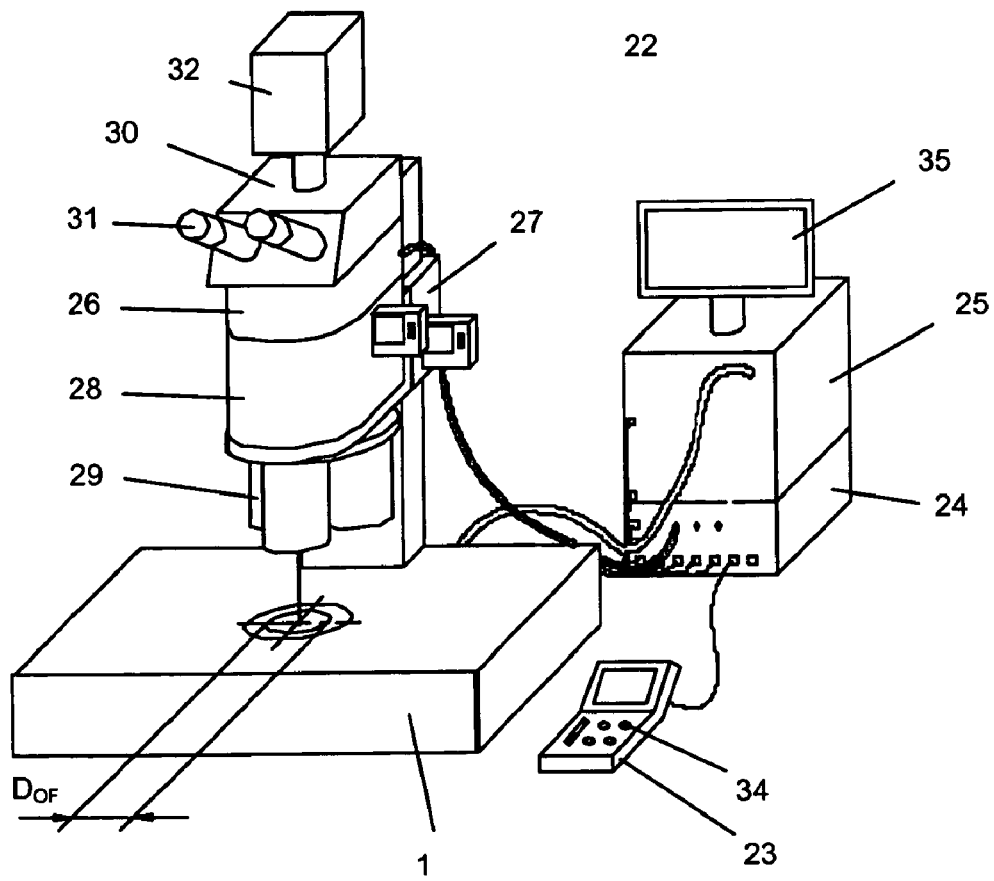
FIG. 3 shows the device according to the invention incorporated in a total microscope system.

In another advantageous construction, FIG. 3 shows the incorporation of the inventive device 1 in a total microscope system 22.

The operation of the total microscope system 22 is preferably carried out via only one control panel 23 which is connected to the control unit 24 for coordinating all components. The control panel 23 comprises operating elements 34, the operating elements 34 including elements for hand-free operation. Further, the control unit 24 comprises elements for displaying the modules used at a given moment 35. A CAN-BUS system is provided for communication of the individual modules and allows all motor-actuated and/or coded components to communicate with each other. Data can be transmitted to, and also received from, the dominant total system. The individual components also report back to the total system about their current status.

Further, the illumination system of the total microscope system 22 comprises the separate cold light source 25 and an intermediate tube for coaxial incident illumination 26. The total microscope system comprises, for example, a focusing drive 27, a zoom body 28, an objective changer 29 with three objectives, and the tube 30 with the two eyepieces 31 and a photo output to which a camera 32 is accommodated. Since all of the adjustable components and modules are actuated by motor and are linked to one another, any mixed light combinations can be generated, stored and exactly reproduced in a user-specific and/or application-specific manner. Further, at least one of the eyepieces 31 may be a special eyepiece, wherein the module being used at a given moment can be displayed by reflecting the corresponding displays into the special eyepiece.

In a particularly advantageous construction which facilitates operation, adjustments that can cause a change in the illumination situation are checked and, if needed, used to readjust the current illumination conditions. All relevant information about the total system is evaluated and useful adjustments carried out without mandatory participation on the part of the user.

For example, it is usually sensible to illuminate only the visual field without energy loss. For this purpose, the object field diameter $D_{OF}$ is calculated from the transmitted data of the coded objective changer 29 for the objective 9 being used at the moment, from the actual magnification of the zoom body 28 and from the visual field diameter, and the corresponding illumination conditions are adjusted by means of the corresponding optics 16, the modules for brightfield illumination 7 or darkfield illumination 8 and the iris diaphragm module 5. The visual field diameter that is used is predetermined either by the eyepieces 31 or the camera 32. While the scattered light can be reduced and the contrast increased through the use of the iris diaphragm module 5, the adapting optics 16 serve to illuminate the object field in a uniform manner without losses.

Further, it is advantageous when the brightness remains constant within the adjusting range when there is a change in the zoom factor and/or the object factor and/or in the effective size of an aperture diaphragm that may possibly be provided. This can also be ensured by evaluating the data of the objective changer 29, the zoom body 28 and an existing adjusted again to the same value by means of light dimming or by the color-neutral brightness control in the illumination unit 17.

As an alternative method, a kind of exposure measurement can be carried out at the location of the image or at the location of an intermediate image for determining the input variable for a constant regulation of the brightness. The intermediate image in a special brightness can be carried out when the image receiver gives a signal suitable for evaluation.

In principle, the proposed device for varying and adjust transmitted illumination for microscopes also makes possible dynamic, time-controlled and/or action-controlled illumination processes in which special illumination situations are called up ending on the elapsed time and/or action repots.

The device according to the invention for varying and adjusting transmitted illumination for microscopes provides a solution which facilitates operation of the transmitted illumination device through an ergonomic arrangement of the operating elements and by adjusting and/or changing the illumination situations in a simple and reproducible manner. It is possible to adjust and store numerous different illumination situations for as many applications as possible. The solution can easily be incorporated in a total microscope system and accordingly allows for full automation.

While the foregoing description and drawings represent the present invention, it will be obvious to those skilled in the art that various changes may be made therein without departing from the true spirit and scope of the present invention.

What is claimed is:

1. A device for varying and adjusting transmitted illumination for a microscope, comprising:
    modules for darkfield illumination, brightfield illumination, and diffuse illumination;
    an iris diaphragm module;
    an illumination unit being provided which is adapted to being selectively coupled to different modules; and
    actuators being provided for implementing adjustments within the modules and for producing desired connections;
    said actuators being operated by operating elements of a control unit, wherein the adjustments within the modules and the implemented connections are detected and are stored in the control unit so as to be reproducible;

wherein the iris diaphragm module is positioned in an optical beam path in connection with the module for darkfield illumination for adapting the illumination when the illumination unit is selectively coupled to the module for darkfield illumination; and wherein the iris diaphragm module is positioned in an optical beam path in connection with the module for brightfield illumination for adapting the object field when the illumination unit is selectively coupled to the module for brightfield illumination.

2. The device according to claim 1;

wherein the module for darkfield illumination comprising a ring light is connected to the illumination unit by a fiber-optic connection and can be introduced into an optical beam path.

3. The device according to claim 1;

wherein the module for brightfield illumination comprising a deflecting mirror which is displaceable and/or rotatable with respect to its position, optics for beam shaping, and at least one optical arrangement for adapting to the size of an object field which module is connected to the illumination unit and can be inserted into an optical beam path.

4. The device according to claim 1;

wherein the module for diffuse illumination comprising a ground glass diffuser screen which module can be inserted into an optical beam path.

5. The device according to claim 1;

wherein a color-neutral dimming and/or spectral mixing of the illumination is carried out by electrically influencing a cold light source.

6. The device according to claim 1;

wherein stepper motors are used as actuators so that sensors for detecting the adjustments within the modules and the implemented connections can be dispensed with.

7. The device according to claim 1;

wherein the operating elements of the control unit are arranged in an ergonomic manner, and the control unit additionally comprises elements for displaying the modules used at that moment.

8. The device according to claim 1;

wherein standard illumination programs for determined applications and/or user-specific illumination programs are stored in the control unit.

9. The device according to claim 1;

wherein the control unit has elements for hand-free operation.

10. The device according to claim 1;

wherein possible adjustments are offered and/or displayed to the user by the control unit.

11. The device according to claim 1;

wherein the brightness of the illumination bringing about a change in image brightness is limited to a maximum value which is not harmful for a user, wherein this maximum value can be predetermined.

12. The device according to claim 1;

wherein the module being used at that moment can also be displayed by reflecting into a special eyepiece.

13. The device according to claim 1;

wherein adjustments that can cause a change in the transmitted illumination are checked and, if needed, used to readjust the actual transmitted illumination.

14. The device according to claim 1;

wherein the adjustments that can cause a change in the transmitted illumination are checked by CAN bus system.

* * * * *

UNITED STATES PATENT AND TRADEMARK OFFICE
CERTIFICATE OF CORRECTION

PATENT NO. : 7,692,857 B2
APPLICATION NO. : 11/539002
DATED : April 6, 2010
INVENTOR(S) : Johannes Knoblich, Tobias Kaufhold and Detlef Hein It is certified that error appears in the above-identified patent and that said Letters Patent is hereby corrected as shown below:

On the Title Page, Item (73):

Please correct the Assignee from "Carl Zeiss Microimaging GmbH" to --Carl Zeiss MicroImaging GmbH--.

Signed and Sealed this

Eighth Day of June, 2010

David J. Kappos
*Director of the United States Patent and Trademark Office*